April 28, 1964   L. R. HEAD ET AL   3,130,418
ARTIFICIAL HEART VALVE AND METHOD FOR MAKING SAME
Filed Nov. 25, 1960   7 Sheets-Sheet 1

INVENTORS
LOUIS R. HEAD
LORAINE M. KESSENICH
BY
ATTORNEYS

FIG.9

INVENTORS
LOUIS R. HEAD
BY LORAINE M. KESSENICH

ATTORNEYS

3,130,418
ARTIFICIAL HEART VALVE AND METHOD FOR MAKING SAME
Louis R. Head, 1322 Judson, Evanston, Ill., and Loraine M. Kessenich, 7463 Harwood, Wauwatosa, Wis.
Filed Nov. 25, 1960, Ser. No. 95,447
19 Claims. (Cl. 3—1)

This invention relates in general to an artificial heart valve and apparatus and method for making the valve, and more particularly to an artificial heart valve adapted to be used between an auricle and ventricle of the heart. Still more particularly, the valve of the present invention is constructed of woven material wherein the valve is hand woven on a manually powered loom and then coated with a plastic. The valve of the present invention is especially useful to substitute for the mitral valve of the heart.

The artificial heart valve of the present invention, as above stated, is especially useful to function as a mitral valve in a heart, although it should be appreciated that it may also function as a tricuspid valve in the heart. However, especially in medical science, it is quite rare to find a malfunctioning tricuspid valve since it is not subjected to the work and stresses handled by the mitral valve. Further, the tricuspid valve operates under a substantially lesser pressure than the mitral valve. Accordingly, the valve in the present invention will be described as functioning in the position of the mitral valve. Further, medical science is primarily interested in using artificial heart valves in human hearts although extensive experimentation is carried on in inserting artificial valves into the hearts of animals.

The artificial valve of the present invention is constructed of woven material, wherein the entire valve is woven in accordance with intricate weaving procedure developed to be carried out on a hand-operated loom. The valve includes a sleeve portion, the upper peripheral edge of which is adapted to be secured by suturing or any other acceptable method to the annulus defined between the left auricle and left ventricle of the heart. Extensions are provided along the lower peripheral edge of the sleeve to define posterior and anterior leaflets while the area between the opposite ends of the leaflets represents the lateral or commissural leaflets. Warp threads extend free from the lower peripheral edge of the sleeve portion and from the peripheral edges of the extensions to assimilate chordae tendineae. The free ends of the threads are secured together to opposed patches that may be defined as papillary patches and thereby secured to the papillary muscles on the left ventricle wall. As in the human heart, the warp threads function as chordae tendineae to control the accurate closing of the valve during its operation.

The valve may be woven from any suitable natural or synthetic fiber including nylon, "Dacron," "Teflon" and others. Before insertion of the valve into the heart, it is coated with a plastic type material rendering it non-permeable, and elastic to aid in opening the valve during its operation. Preferably, the plastic is of such quality as to provide a near perfect as possible slippery and smooth surface in order to minimize the friction that might be generated by the movement of blood thereover, thereby enhancing the free flow of blood through the valve. Still more preferably, the plastic should be non-wettable and completely inert to the body. An example of the type of plastic that may be used is "Cylastic."

Heretofore, there has been developed a number of artificial heart valves that may be inserted to function as mitral valves in the heart, but many difficulties have been encountered because of their construction and design. Particularly, valves heretofore developed have been undesirable because their operation causes excessive obstruction of the flow of blood from the left ventricle and into the aorta thereby causing a complete inefficiency in the heart action and subsequent malfunctioning. Further, heretofore developed artificial mitral valves have tended to cause a clotting problem about the valve because of the excessive amount of material and structure employed. Additionally, some mitral valves heretofore developed have caused excessive destruction of the blood cells which is also undesirable.

Accordingly, it is an object of the present invention to obviate the above mentioned difficulties and provide a highly efficient and positive operating artificial heart valve.

Another object of this invention is in the provision of an artificial heart valve for functioning as a mitral valve in the heart which assimilates the actual mitral valve in the human heart.

Still another object of this invention is to provide an artificial heart valve constructed of woven fibers in such a manner as to closely duplicate the mitral valve of the human heart.

A further object of this invention is to provide an artificial mitral valve for the heart which is constructed to substantially eliminate destruction of blood cells during operation, obstruction of blod flow from the left ventricle into the aorta when the valve is in closed position, and clotting or stenosis about the valve structure.

A still further object of this invention resides in the provision of an artificial heart valve woven from natural or synthetic fibers, and coated with a plastic type material suitable to render the valve structure non-permeable, non-wettable, inert, elastic, and smooth surfaced.

Another object of the invention is to provide an artificial mitral valve constructed of woven fibers and then coated with plastic, wherein the valve includes the minimum amount of material in order to obviate any clotting about the valve and to eliminate obstruction of blood flow from the ventricle into the aorta when the valve is closed.

Still another object of this invention is to provide an artificial mitral valve for the heart constructed of woven material and having a sleeve portion defining the closing elements of the valve, and the warp threads extending from the closing elements of the valve to a pair of patch portions to be attached to the ventricle wall whereby the construction of the valve is such that the forces in the valve during its operation are properly and evenly distributed so that the valve will not pull out after extended usage.

The heart valve of the present invention is completely hand woven on a hand-powered loom. And since some of the warp threads extend freely between spaced woven parts of the valve, it becomes necessary to provide individual warp beam control of the warp threads. Accordingly, a new and improved warp beam is provided for a conventional hand-powered loom to give individual warp beam control of the warp threads. Specifically, the present invention includes the feature of having a hand-powered loom wherein the warp beam is mounted in superposed relation to the castle structure of the loom, and wherein a plurality of horizontally and vertically spaced spools are utilized to secure the warp ends and store warp threads.

When operating the loom of the present invention to weave an artificial heart valve of the present invention, it is necessary and important to follow a new and improved weaving procedure because of the necessity of having free runs of warp threads between spaced woven parts of the artificial heart. The method of making the heart valve according to the invention includes generally the weaving of a tubular or sleeve portion, the weaving of a pair of extensions on the tubular portion, the defining of free runs of warp threads and the weaving of patch portions in spaced relationship from the tubular portion for the purpose of joining together the free runs of the warp threads in such a way as to permit proper operation of the valve for closing and opening purposes.

Accordingly, it is an object of this invention to provide a new and improved method of weaving wherein spaced woven portions of the part woven are interconnected by the warp threads used in weaving the element.

Another object of this invention resides in the provision of weaving a new and improved heart valve.

After the heart valve has been woven, and prior to using the heart valve, the valve is coated with a plastic type material to render the valve non-permeable, non-wettable, elastic, inert to the body, and smooth surfaced. Additionally, it may be appreciated that the valve will be dimensionally prepared for proper fit and operation in the heart. In this connection, the sleeve portion of the valve is prepared so that the upper edge thereof which is connected to the annulus may be connected in such a way as to substantially evenly distribute the stresses generated during operation of the valve.

It is therefore still a further object of this invention to provide a method of making an artificial heart valve by weaving the valve, coating it with a plastic type material and dimensionally preparing the valve for insertion into the heart.

Another object of this invention is in the provision of a method of making an artificial heart valve by fabricating the valve in the usage of a new and improved method of weaving, and coating the fabricated valve with a plastic type material that is non-permeable, non-wettable, completely inert to the body, elastic, and such as to provide a slippery and smooth surface for the valve.

Other objects, features and advantages of the invention will be apparent from the following detailed disclosure, taken in conjunction with the accompanying sheets of drawings, wherein like reference numerals refer to like parts, in which.

Heart Valve Structure

Referring now to the drawings, and particularly to FIGS. 1–5, the heart valve of the present invention is generally designated by the numeral 15 and includes generally a tube or tubular portion 16, an extension 17 along the lower peripheral edge of the tubular portion, a second extension 18 also along the lower peripheral edge of the tubular portion, a pair of patch portions 19 and 20 interconnected with the tubular portion by cords 21 and 22, respectively, and an upwardly projecting extension or aortic bulge 23 along the upper peripheral edge of the tubular portion and in alignment with the extension 18.

Figure 1:
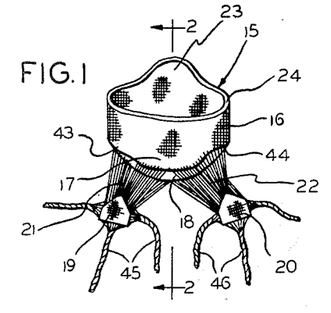
FIG. 1 is a perspective view of the artificial heart valve constructed in accordance with the invention.
Figure 2:
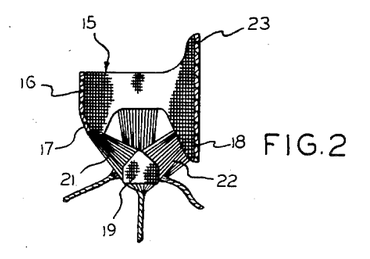
FIG. 2 is a transverse sectional view of the heart valve taken substantially along line 2—2 of FIG. 1.
Figure 3:
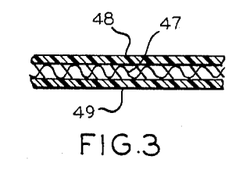
FIG. 3 is a greatly enlarged detail sectional view taken through a part of the heart valve to illustrate a woven fabric of the valve as coated with a plastic material.

In a natural heart, the tubular or sleeve portion 16 would correspond to the continuous circle of tissue in the mitral valve, while the extensions 17 and 18 would respectively correspond to the posterior and anterior leaflets. Moreover, the upwardly projecting extension 23 coacts to define a part of the anterior leaflet. The portions of the tubular portion 16 between the extensions 17 and 18 would correspond to the lateral or commissural leaflets. Similarly, the cords 21 and 22 would correspond to the chordae tendineae which control the approximation of the leaflets. The patch portions 19 and 20 may be for clarity purposes defined as papillary patches and would be adapted to be secured to the papillary muscles on the ventricle wall. Suturing would be employed to connect the upper peripheral edge 24 of the tubular portion 16 within the heart.

Figure 4:
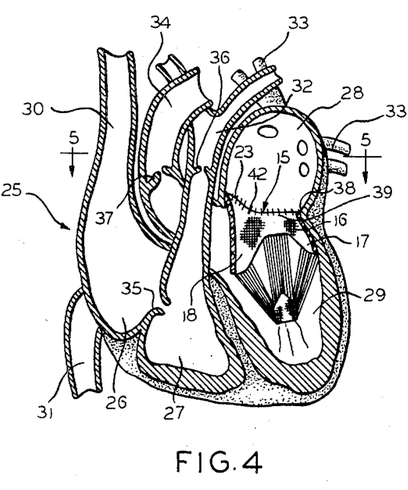
FIG. 4 is a vertical sectional view taken through a heart and illustrating the artificial heart valve of the present invention inserted as a mitral valve.
Figure 5:
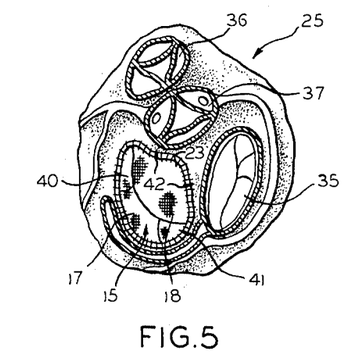
FIG. 5 is a sectional view taken through the heart taken substantially along line 5—5 of FIG. 4.
Figure 6:
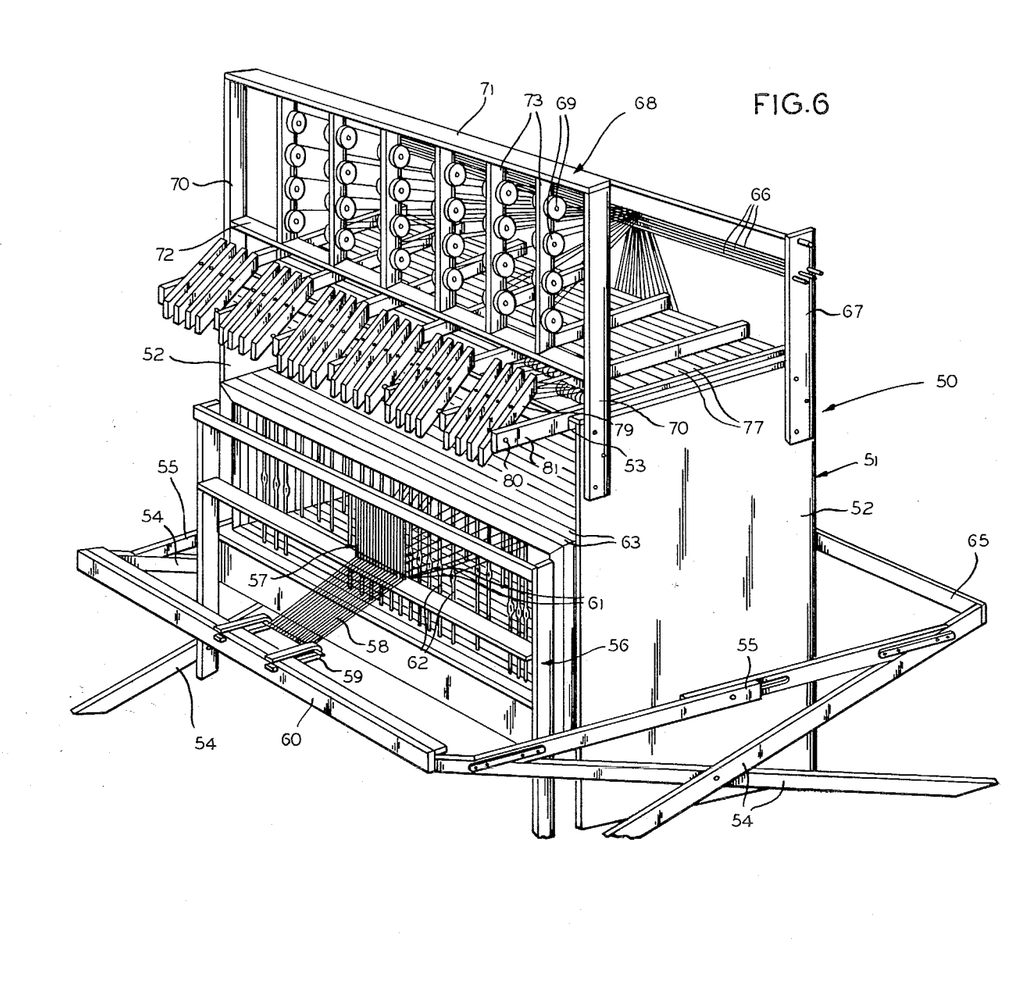
FIG. 6 is a perspective view of the loom according to the invention upon which the heart valve is woven.

The heart is illustrated in FIGS. 4 and 5 and generally designated by the numeral 25 and includes generally a right auricle 26, a right ventricle 27, a left auricle 28, and a left ventricle 29 which function upon contraction and expension of the heart to pump the blood through the circulatory system. In operation, blood is circulated and pumped from the right auricle after being received thereby from the circulatory system through the superior vena cava 30 and the inferior vena cava 31 and pumped out of the heart through the pulmonary artery 32 and into the lungs. The blood is returned to the heart from the lungs into the left auricle through the pulmonary veins 33 and subsequently pumped into the left ventricle. From the left ventricle, the blood is pumped out through the aorta artery 34 and throughout the body. To prevent back flow of blood from the right ventricle into the right auricle, a tricuspid valve 35 is provided therebetween. Similarly, to prevent back flow into the right ventricle from the pulmonary artery, a pulmonic valve 36 is located in the pulmonary artery. And as seen in FIGS. 4 and 5, the artificial heart valve 15 of the present invention is arranged between the left auricle and the left ventricle for the purpose of replacing the mitral valve that functions to prevent the return flow of blood into the left auricle from the left ventricle. And an aortic valve 37 is arranged in the aorta artery for the purpose of preventing return flow of blood pumped through the aorta to return to the left ventricle.

A ridge 38 annular in shape is defined between the left auricle and the left ventricle and will be referred to as the annulus hereinafter. This annulus defines the orifice through which the blood flows when the mitral valve is open. It is important to utilize the substantial full measurement of the annulus to reduce the work involved during the pumping action of the heart and to obtain the maximum flow of blood from the left auricle into the left ventricle and thereby eliminate stenosis. Accordingly, an artificial valve must be constructed so that it will provide a maximum opening or orifice when the valve is in open position as seen in FIG. 4. Further, it is important to reduce if not substantially eliminate any obstruction to blood flow in the left ventricle when the valve is closed as may be noted in FIG. 5, for reduction in obstruction of blood flow reduces the clotting factor heretofore existing in artificial mitral valves where a substantial amount of material extended into the left ventricle when it was closed.

The artificial mitral valve of the present invention is secured in position by suturing at 39 the upper peripheral edge 24 of the tubular portion 16 to the annulus 38. This includes suturing the edge of the extension 23 to the area about the annulus at that point such as slightly within the left auricle as shown in FIG. 4.

In the natural heart, a dip or recess is defined in the annulus in alignment with the aorta artery. Thus, the annulus is not a perfect annulus, and the aortic bulge 23 at the upper end of the anterior leaflet is dimensioned to fit in this dip thereby providing a near as possible accurate fit and better operating valve.

As above stated, the aortic bulge 23 aligns with the anterior leaflet or extension 18, both of which align with the aorta artery in relative positioning within the heart. The anterior leaflet portion 18 together with the aortic bulge comprises the major closure portion of the valve, for which reason the base of the aortic bulge 23 serves to define a heavy duty hinge for this leaflet during its opening and closing operation, thereby avoiding the possibility of drawing in stress-wise the opposed edges of the tubular portion 16 which align with the lateral leaflet portions as indicated by the numerals 40 and 41 in FIG. 5. Extra heavy suturing 42 is provided at the opposite base ends of the aortic bulge since these areas of the tube 16 encounter greater stresses during operation of the valve. One of the main problems involved in an artificial mitral valve resides in attaching the valve in position so that it will properly distribute the forces in the valve and not pull out after extended use, and this problem is overcome by the present invention. The aortic bulge 23 accordingly further operates to prevent undesirable buckling or folding of the tubular portion 16 during the closing operation.

Another problem that the present valve is believed to obviate is to eliminate clotting which is usually caused by an excess amount of material from an artificial mitral valve extending into the left ventricle during its closed position. The mitral valve of the present invention is made with a minimum amount of material but sufficient enough to insure that the leaflets approximate or close properly to prevent leakage therethrough. Further, because the valve of the present invention approximates properly, the tubular effect is also reduced. The tubular effect which is a form of leakage caused by the volume of blood lost to the left ventricle upon closing of an artificial valve is substantially minimized, if not eliminated, by the present valve structure.

The valve of the present invention is constructed by weaving it on a hand loom from a suitable natural or synthetic fiber and coating the woven structure and the cords with a plastic-like material. As noted in FIG. 3, woven fabric as designated by the numeral 47 is sandwiched between the coatings of plastic 48 and 49. Actually, the fabric will be substantially impregnated as well as coated with the plastic type material. For example, the fiber may be of nylon, "Dacron," "Teflon" or the like. The plastic-type material employed is preferably non-permeable, non-wettable, elastic and resilient, inert in the body and capable of defining a smooth and slippery surface. One type of such material found suitable is "Cylastic," a non-reactive silicon rubber. A slippery and smooth surface is important from the standpoint of minimizing, if not eliminating, any friction that may tend to be generated by the flow of blood thereover. The elastic characteristic of the plastic further enhances the operation of the valve during its opening and closing operation. Particularly the elasticity characteristic tends to straighten the leaflets during opening of the valve and prevents the anterior leaflet from blowing into the aorta.

The cords 21 and 22 extending between the sleeve portion 16, the leaflets and the patch portions 19 and 30 are defined by the warp ends utilized to serve the sleeve portion 16 and accordingly interwoven in the structure. These cords are also interwoven in the patch portions 19 and 20. The cords which extend from the lower peripheral edge portions 43 and 44 provide the warp threads for weaving of the patch portions 19 and 20, while the cords extending from the leaflet portions 17 and 18 are woven in weft-wise in the patch portions. Some of the cords extending from the leaflet portions are also woven in the leaflet portions weft-wise in order to define weft-wise and warp-wise connections between the leaflet portions and the patch portions. Particularly, the weft-wise woven in threads in the anterior leaflet portion 18 operate in a sling-like fashion with respect to the leaflet when it is in closed position. This action further enhances the channel-like shape of the anterior leaflet portion when it is in closed position in order to define a surface along which the blood may flow out of the left ventricle and into the aorta artery. Additionally, the warp-wise and weft-wise pulling action between the patch portions and the leaflets serve to better distribute the stresses involved in the valve during the closing operation. The cords 21 and 22 will be substantially taut when the valve is in closed position and relaxed when the valve is in open position. It is important that the length of the cords be so established as to effect proper closing of the valve and eliminate leakage therethrough. Because the exact desired length of the cords may differ, the weft-wise woven warp ends in the patch portions may be adjusted by pulling them warp-wise in either direction through the patch portions before coating the valve with the plastic material.

The cords and patch portions are also coated or impregnated with plastic material. Accordingly the cords are elastic or resilient and tend to stand away from the flow of blood into the aorta when the valve is closed, as well as tending to stand or position adjacent the ventricle wall when the valve is open to permit unimpeded blood flow into the left ventricle.

It will be appreciated that the aortic bulge 23 and the dimension of the sleeve portion depth may also be established after the valve has been woven. The actual dimension and shape of the leaflet depends upon the bulge desired of the leaflets when the valve is in closed position. If a greater or lesser amount of bulge is desired, larger or smaller leaflets may be woven.

Thus, it can be appreciated that by weaving the valve of the present invention some of the weaving material, particularly the warp ends, may be arranged to represent chordae tendineae and brought out of the material, and then secured together again and woven into the patch portions. Therefore a single structure is provided and the cords are effectively integral with the tube portion. Further at least some of the warp ends woven in weft-wise are arranged to extend from the leaflets inwardly of their opposite edges thereby providing better control valve closing operation thereof.

In some instances, it may not be possible to secure the papillary patches 19 and 20 to the papillary muscles in the left ventricle and it thereby becomes necessary to secure these patches by running transventricular lines through the wall of the ventricle that may be secured on the outer surface of the heart. Accordingly, the warp ends of the woven valve may be of such a length as to extend from the patches and define transventricular lines 45 and 46, respectively, although normally these lines are not needed.

While the valve of the present invention is disclosed and defined as a mitral valve, it should be appreciated that the valve could be so constructed as to function as a tricuspid valve which also utilizes the leaflet and chordae tendineae type construction.

*Loom Structure*

The artificial mitral valve of the present invention is woven on a hand-powered loom as shown in FIGS. 6, 7, 8 and 9 and generally designated by the numeral 50. The loom includes a castle structure 51 having opposed side members 52 interconnected by suitable cross bars 53 (only one shown). The castle structure is supported on a stand having crossed legs 54 at opposite sides thereof and connected to the side members 52 which are additionally braced by braces 55. A beater 56 having a reed 57 is pivotally mounted to one of the legs 54 for oscillating movement.

Figure 7:
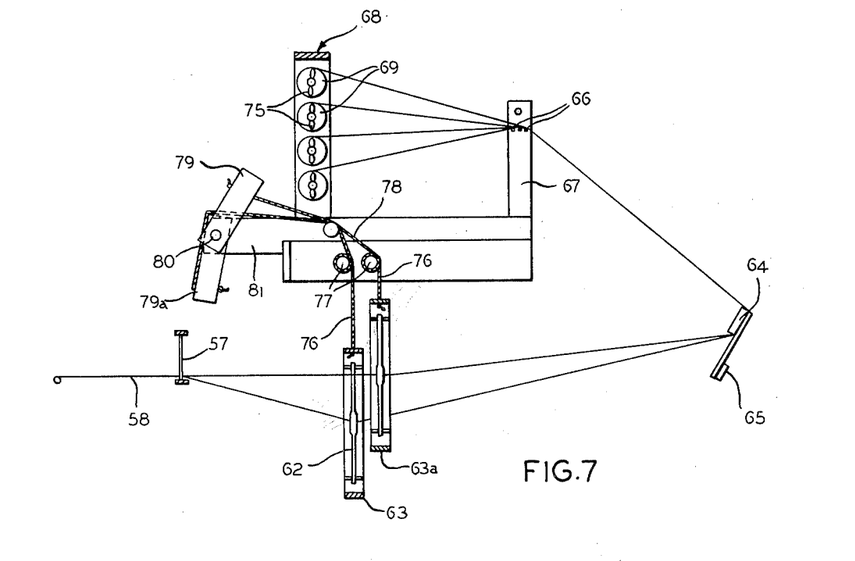
FIG. 7 is a somewhat diagrammatic view of the threading of the loom and illustrating a pair of harnesses and how they operate to define a shed.

Warp ends 58 are suitably secured to a clamp 59 carried on a cross bar 60 that is secured between the upper ends of the legs 54. The warp ends are threaded through the dents in the reed 57 and subsequently through eyes 61 of heddles 62 carried in harnesses or heddle frames 63. The harnesses 63 are vertically reciprocably carried in the castle structure between the side members 52. As seen in FIG. 7, the warp ends are then threaded about a guide bar 64 carried on a cross bar 65 extending between the upper ends of the legs 54 which project away from the back end of the loom. The warp ends then are trained upwardly and forwardly over guide bars 66 supported between uprights 67 projecting upwardly from the opposite sides of the side members 52. From the guide bars 66, the warp ends are secured to the warp beam 68.

In order to provide individual control of the warp ends threaded through the various heddles and the various harnesses, the warp ends are secured to spools 69 carried on the warp beam 68. As seen particularly in FIG. 6, the warp beam 68 includes opposed uprights 70 secured to the castle structure and projecting thereabove, upper and lower cross braces 71 and 72, and a plurality of horizontally spaced and vertically extending spool mounting bars 73. As seen particularly in FIG. 9, the spools 69 are actually carried on spindles 74 fixed to the spool mounting bars 73. Suitable means such as wing nuts 75, FIG. 7, may be provided for locking the spools 69 against rotation on the spindle 74.

Figure 8:
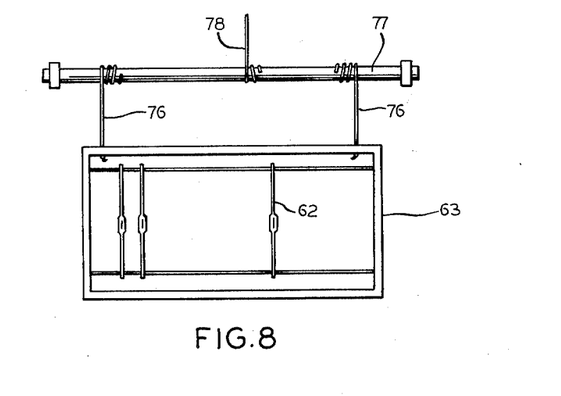
FIG. 8 is a front elevational view of a harness removed from the loom and illustrating how it is raised and lowered by operating mechanism.

Referring now particularly to FIGS. 7 and 8, each harness 63 is suspended by a pair of flexible cables or ropes 76 secured to a rotatably mounted bar 77. The bars 77 extend transversely of the castle structure and are carried at the upper end thereof. A control cable or rope 78 is secured at one end to the bar 77 and at the other end to an actuating lever 79.

The actuating levers 79 are pivotally mounted on a pin 80 extending transversely of the loom and supported on forwardly extending horizontally spaced cantilever members 81. The end of the control cable 78 is wound around the bar 77 a few turns in one direction, while the ends of the suspending cable 76 are wound about the control bar 77 in another direction. Accordingly, upon movement of an actuating lever 79 to the position as shown by the lever 79a in FIG. 7, unwinding of the control cable 78 will be effected from the bar 77 thereby rotating the bar and winding on more of the cable 76 to raise the harnesses as shown particularly by the harness 63a in FIG. 7. And raising one or more harnesses relative to other harnesses defines a shed in the warp ends 58 for reception of a weft thread during the weaving process.

Figure 9:
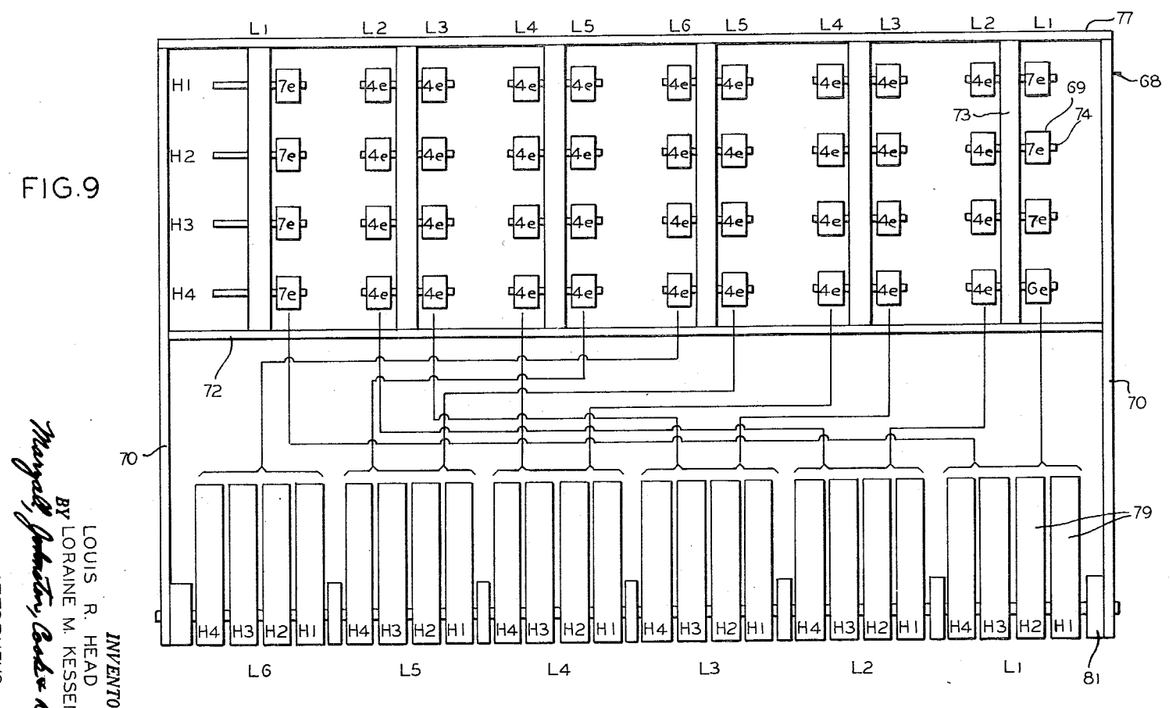
FIG. 9 is a diagrammatic view of the operating levers of the loom and illustrating the warp ends controlled thereby and their location on the warp beam.

Normally, weaving is accomplished by a loom having four harnesses. However, the weaving process of the present invention requires shed control of many warp ends and necessitates having twenty-four harnesses. For simplicity in describing the operation of the loom of the present invention in effecting the weaving process, the harnesses have been divided into groups of four and designated as looms L-1, L-2, L-3, L-4, L-5 and L-6 as shown in FIG. 9. Accordingly, each loom includes harnesses H-1, H-2, H-3 and H-4. And to further appreciate the weaving process, lines are drawn in FIG. 9 to indicate mechanically the connections betwen the warp ends coming from the spools and controlled by the six looms. Further, each vertical row of spools represents a group of warp ends controlled by the operation of a loom and are so designated while each row of spools extending transversely represents the warp ends controlled by the harnesses of the looms as indicated in FIG. 9.

It will be appreciated that a greater or lesser number of looms and harnesses may be provided depending upon the woven structure desired to accomplish, while still providing individual control of warp ends on the warp beam in accordance with the present invention. In weaving the artificial heart valve of the present invention, a fifty dent per inch reed is employed for a double sley weaving procedure. Thus, the reed is wide enough to provide one hundred dents whereby two warp ends are threaded through all by one of the dents.

*Method of Weaving Heart Valve Structure*

Figure 10:
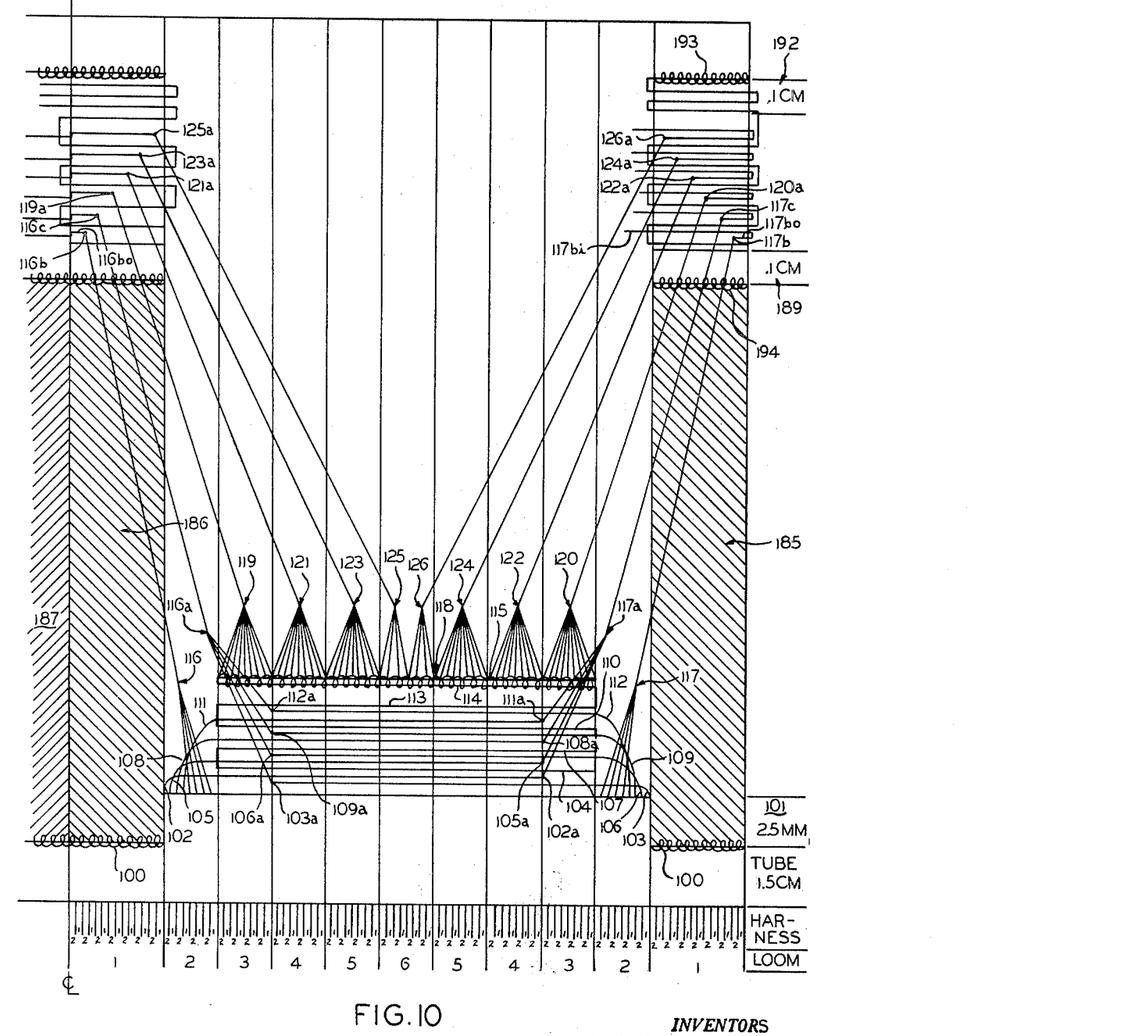
FIG. 10 is a schematic view of the weaving operation and particularly showing the top part of the valve and tube as located in the loom.
Figure 11:
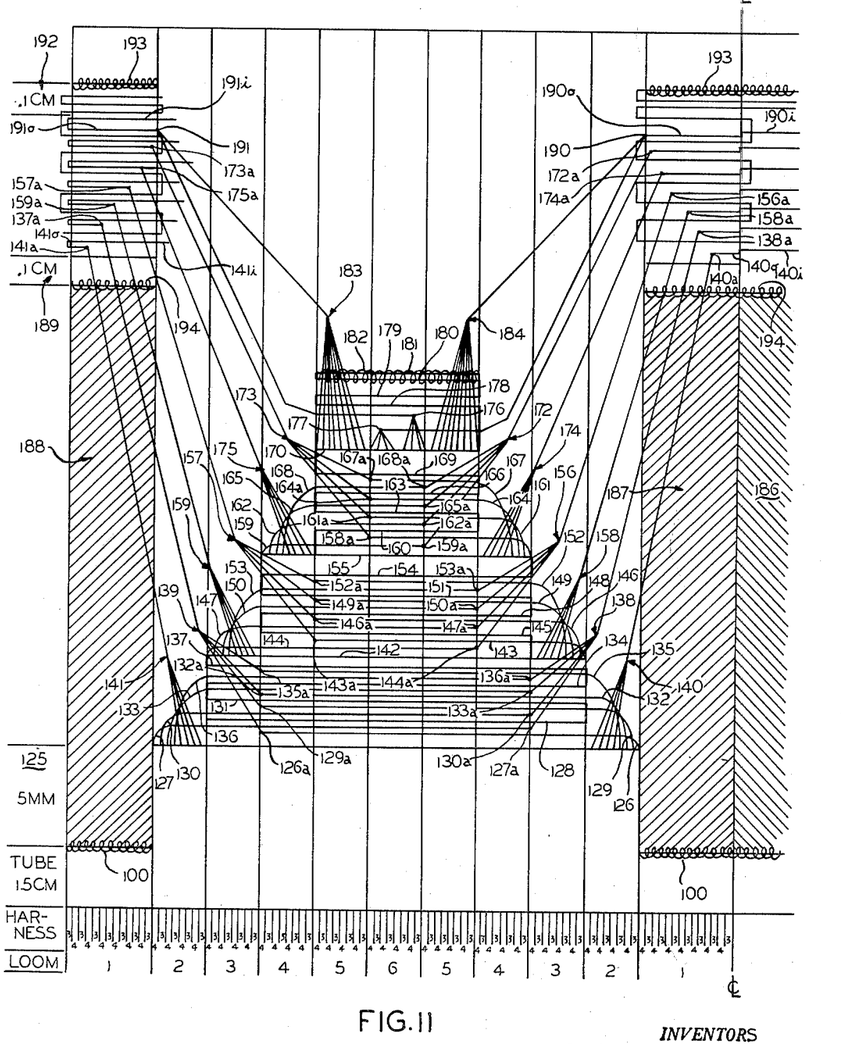
FIG. 11 is similarly a schematic view and layout of the weaving operation but illustrates the bottom of the tube or valve as it is located in the loom.
Figure 12:
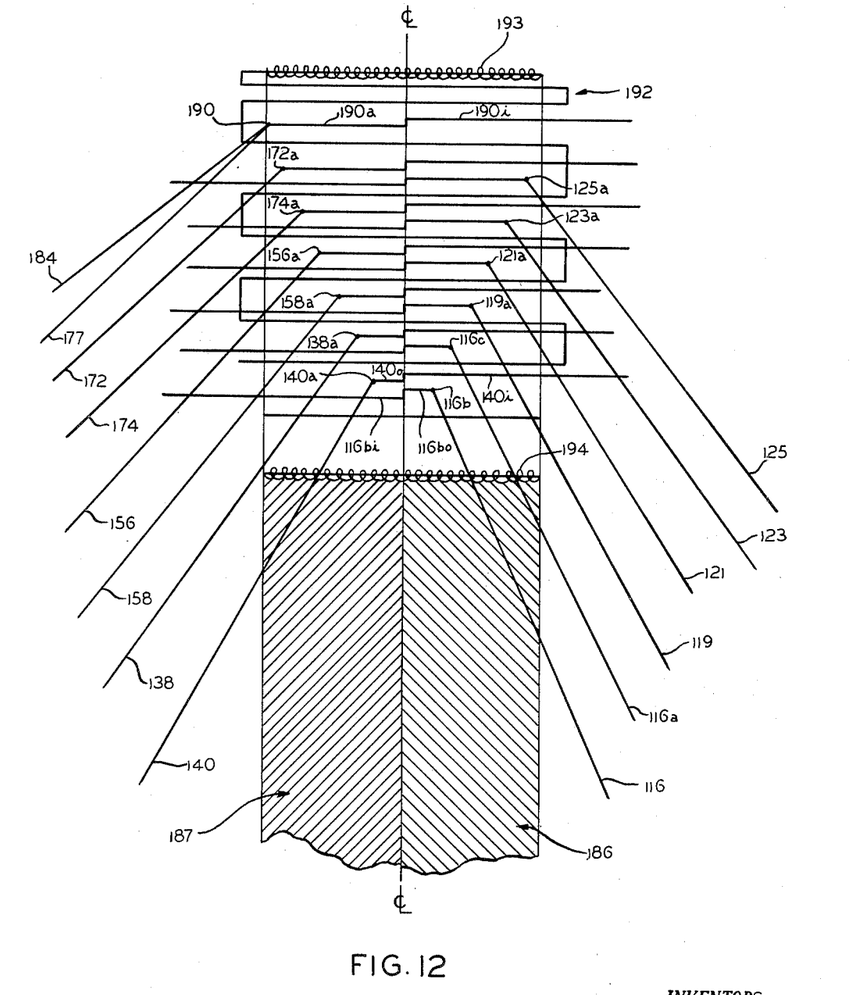
FIG. 12 is an enlarged schematic view illustrating the weaving pattern of one patch portion of the valve, particularly the portion between the top and bottom of the tube at the left-hand side of the valve.

Referring now to FIG. 9 which diagrammatically illustrates the operational hook up between the harness controls of the looms and the spools of the warp beam, and FIGS. 10, 11 and 12 which show a layout in schematic of the weaving procedure for constructing the heart valve, the initial step comprises weaving the tube or tubular portion in a conventional manner as is well known for weaving seamless tubular items. It is further well known that at least two sheds must be formed in the weaving of tubular items, wherein one shed contains one more warp end or thread than the other shed, thereby to avoid inclusion of two warp ends between the successive crossings of the weft thread at one side from one shed to the other during weaving. Further, it should be appreciated that at least four harnesses must be employed in successively forming two separate sheds for the alternate passage of the shuttle therethrough.

The dimensional size of the tubular portion or tube may vary and may require a greater or lesser number of warp ends or threads to be used than that illustrated in FIGS. 10 and 11. FIG. 10 represents the top of the tube, while FIG. 11 represents the bottom thereof, and it can be seen that the warp ends for the top of the tube are controlled by harnesses H-1 and H-2 while the warp ends for the bottom of the tube are controlled by harnesses H-3 and H-4. Each numeral opposite the area designated "Loom," FIGS. 10 and 11, defines the area of operation along the tube of the looms L-1, L-2, L-3, L-4, L-5 and L-6, while the numerals opposite the designation "Harness" represent the number of warp ends provided for weaving the heart valve of the present invention and the particular warp ends controlled by the harnesses H-1, H-2, H-3 and H-4 of the looms. Harnesses H-1 and H-2 control the warp ends for the top of the tube, while harnesses H-3 and H-4 control the warp ends for the bottom of the tube, and there is one less warp end for the bottom of the tube than the top of the tube. Actually one hundred warp ends are provided for the top of the tube, FIG. 10, while ninety-nine warp ends are provided for the bottom of the tube, FIG. 11. Harnesses H-1, H-2 and H-3 of loom L-1 at opposite sides of the tube control seven warp ends each, while harness H-4 of loom L-1 on one end of the tube controls seven warp ends and on the other end of the tube controls six warp ends. Harnesses H-1, H-2, H-3 and H-4 of looms L-2, L-3, L-4 and L-5 on each side of the tube control four warp ends each, while harnesses H-1, H-2, H-3 and H-4 of loom L-6 control four warp ends each at the center of the tube.

The first step in making of the heart valve consists in weaving the tube to a depth of approximately 1.5 centimeters as illustrated diagrammatically in FIGS. 10 and 11 by the area opposite the designation "Tube."

The next step consists in weaving the extension on the tube which corresponds to the posterior leaflet of the valve during which time work is performed on the top of the tube, FIG. 10. The width of this extension includes the area defined by the warp ends controlled by looms L-2, L-3, L-4, L-5 and L-6. Accordingly, loom L-1 is rested, and since no work is being done on the bottom of the tube, harnesses H-3 and H-4 on looms L-2, L-3, L-4, L-5 and L-6 are also rested. In order to hold the weft in place along the tube in the area of loom L-1, overcast 100 is provided in the area of loom L-1.

Approximately 2.5 millimeters of weaving continues beyond the termination of the tube between looms L-2, L-3, L-4, L-5 and L-6 as shown in the area opposite the numeral designation 101. This is accomplished by moving the shuttle and weft toward the left of the loom through the side defined by harness H-1 and back to the right with the shed defined by harness H-2 until the desired depth of weaving is obtained and ending with the shuttle at the right-hand end of the loom.

The next step involves defining the cord representing the chordae tendineae of the valve which consists of releasing the warp threads coming from the spools handling the warped threads of harnesses H-1 and H-2 on loom L-2 so that these warp threads may be pulled out a predetermined distance such as about sixteen inches and cut. The ends remaining in the reed may be taped or otherwise secured to the beater so that they are out of the way, but with enough slack to permit continued beating. The spools are again locked in position. These warp ends define the first set of cords, wherein there are eight warp ends on each side of the tube.

Since it is desired to have four of the warp ends on each side woven on the extension to provide weft-wise pull during operation of the extension and the other four warp ends on each side of the tube to provide warp-wise pull, it is necessary to weave in four warp ends from each side of the tube. This is accomplished by defining a shed in operating harnesses H-1 of looms L-2, L-3, L-4, L-5 and L-6. It should be appreciated that harnesses H-1 and H-2 of loom L-2 are now at rest. With the shed defined by harnesses H-1 of looms L-3, L-4, L-5 and L-6, the outside warp ends 102 and 103 are taken weft-wise through the entire shed except for the last four warp ends on each side at 102a and 103a, respectively. The warp ends 102 and 103 are actually brought through the upper part of the shed between the warp ends of looms L-3 and L-4. The warp ends are brought through the upper part of the shed and then the shuttle is taken through the shed to the left as illustrated by the weft thread 104. It will be appreciated that beating always takes place where necessary. The shed is then changed wherein harnesses H-2 of looms L-3, L-4, L-5 and L-6 are raised. The next outside warp ends 105 and 106 are taken weft-wise through the shed and brought out before the last four warp ends at 105a and 106a, respectively. The shuttle is then taken through the entire shed to the right defining the positioning of weft thread 107 followed by changing the shed to be defined by harnesses H-1 of looms L-3, L-4, L-5 and L-6. The next warp ends 108 and 109 are then likewise taken weft-wise through the shed defined by the harnesses H-1 and brought out four warp ends inwardly at 108a and 109a. The shuttle is then taken through the entire shed to define the positioning of weft thread 110 and followed by changing of the shed to be defined by harnesses H-2 of looms L-3, L-4, L-5 and L-6. The final warp ends 111 and 112 are taken weft-wise through the shed and brought out at 111a and 112a, after which the shuttle is taken through the entire shed toward the right to define location of the weft thread 113.

To secure this portion of the weaving in position a tabby left on the shed defined by harnesses H-1, weft thread 114 and tabby right through the shed defined by harnesses H-2 of looms L-3, L-4, L-5 and L-6, weft thread 115 are taken. At this point, it will be appreciated that four cords defined by warp ends 102, 105, 108 and 111 are woven in weft-wise at the right-hand side as seen in FIG. 10 and secured together at their ends, while four warp ends 103, 106, 109 and 112 are woven in weft-wise at the left-hand side and secured together at their ends. Additionally, four remaining warp ends 116 still extend from loom L-2 on the left side and four warp ends 117 still extend from loom L-2 on the right side to define cords which will pull from the extension warp-wise and may be tied together at their ends. The warp ends woven in weft-wise are designated at 116a and 117a.

The weft thread in the shuttle is then disconnected so that enough thread remains to overcast along looms L-3, L-4, L-5 and L-6 as designated by numeral 118. Of course, this overcast will only concern the weaving along harnesses H-1 and H-2 of these looms and serves to hold the weft threads in place.

The remaining cords to be provided are to be arranged to pull only warp-wise. The next set of cords is defined by releasing the spools holding the warp ends controlled by harnesses H-1 and H-2 on loom L-3 so that the warp ends may be pulled and cut as were the warp ends from harnesses H-1 and H-2 of loom L-2. Again the spools will be locked in position on the warp beam and the ends extending through the reed may be taped to the beater in such a manner as not to impede beater action. The ends extending from the overcast end of the extension as defined at 119 and 120 may be secured together at the very ends by tying knots therein, while yet keeping the ends 119 and 120 separated from each other on opposite sides of the extension.

A third set of warp-wise pulling cords is defined by following this same procedure with respect to the ends 121 and 122 in harnesses H-1 and H-2 of loom L-4. Accordingly these ends will also be cut in a like manner after releasing the spools at opposite sides of the loom L-1 holding these ends.

A still fourth set of cords is defined by following this same procedure with respect to the ends controlled by harnesses H-1 and H-2 of loom L-5 and is defined in FIG. 10 by the numerals 123 and 124.

Finally, a fifth set of cords is defined by releasing the spools controlling the warp ends of harnesses H-1 and H-2 of loom L-6. In this case there is only a centrally located group of warp ends, eight in number, which are separated to define two groups of four ends each as designated by the numerals 125 and 126. Again, the very ends of these warp ends are knotted together. This final operation concludes the work performed on the top of the tube in defining the extension corresponding to the posterior leaflet and the cords corresponding to the chordae tendineae controlling operation of this leaflet.

Referring now to FIG. 11 which represents the bottom side of the tube as it is held in the loom, harnesses H-1 and H-2 of looms L-2, L-3, L-4, L-5 and L-6 will be at rest since the warp ends are severed from the harnesses H-1 and H-2 of the loom. And with loom L-1 still at rest, the extension from the tube which represents the anterior leaflet will be woven on looms L-2, L-3, L-4, L-5 and L-6 by working harnesses H-3 and H-4 thereon. Approximately five millimeters of conventional weaving is accomplished by alternately defining the sheds in operation of harnesses H-3 and H-4 and ultimately shuttling the weft threads from left to right and back again until a depth of weaving of approximately 5 millimeters is completed, this being represented opposite the area designated by the numeral 125. Specifically, the weft thread will be taken toward the left of the loom through the shed defined by harnesses H-3 of looms L-2, L-3, L-4, L-5 and L-6 and back to the right of the loom through the shed defined by harnesses H-4 of looms L-2, L-3, L-4, L-5 and L-6. After the desired depth of weaving is completed, with the shuttle carrying the weft thread positioned at the right-hand side of the loom, the steps for forming the cords which represent the chordae tendineae are initiated. Again as with the extension on the top of the tube it is desired to have warp ends going weft-wise as well as warp-wise in order to properly distribute the stresses during operation of the valve and to assimilate as nearly as possible the natural mitral valve structure.

Because the schematic view of the weaving in FIG. 11 is a continuation of the layout from FIG. 10, the view shows the outside of the tube or looking at the tube from underneath while it is placed in the loom. Therefore, when it is stated that a weft thread is moved toward the right as viewed in FIG. 11, it is actually moved or taken to the left as it actually is situated on the loom during the weaving process. For purposes of clarity, reference toward movement of the shuttle and the weft thread will be described as it appears on this diagrammatic layout.

In forming the first set of cords, the spools on the warp beam holding the warp ends controlled by harnesses H–3 and H–4 of loom L–2 are released so that the warp ends may be pulled out about sixteen inches and cut. The ends coming from the loom may be knotted or otherwise secured together and then taped to the beater as described above in connection with the making of the cords on the top side of the tube. The outer four warp ends extending from the opposite sides of the loom in loom L–2 are then woven in weft-wise with the warp ends of looms L–3, L–4, L–5 and L–6 in a similar manner as were the outer four warp ends on each side of loom L–2 of harnesses H–1 and H–2 woven in weft-wise on the top part of the tube.

A shed is defined by raising of harnesses H–3 of looms L–3, L–4, L–5 and L–6, and the outermost warp ends 126 and 127 from loom L–2 are crossed through the shed and brought out within four warp ends or between looms L–3 and L–4 at 126a and 127a. Although the warp ends 126 and 127 would be brought upwardly as viewed in FIG. 11, they would actually be taken through the lower part of the shed and downwardly as positioned in the looms. As before, the beater would be operated after bringing the warp ends through weft-wise. The shuttle is then taken left as viewed in the loom and right as viewed in FIG. 11 so that a weft thread 128 overlies the warp ends 126 and 127.

A shed is then formed with harnesses H–4 of the looms L–3, L–4, L–5, and L–6, after which the next two outermost warp ends 129 and 130 are crossed over through the shed and out at 129a and 130a in alignment with the warp ends 126 and 127 between the warp ends of looms L–3 and L–4. The shuttle is then taken to the left as seen in FIG. 11 to position weft thread 131 and lock in the warp ends 129 and 130.

Similarly the next outermost warp ends 132 and 133 are crossed over through the shed defined by harnesses H–3 of looms L–3, L–4, L–5 and L–6 and taken out withing four warp ends from the end or between the looms L–3 and L–4, and followed up by taking the shuttle to the right as viewed in FIG. 11 to locate a weft thread 134 against the warp ends 132 and 133. Finally with the shed defined by harnesses H–4 of looms L–3, L–4, L–5 and L–6, the last two outermost warp ends 135 and 136 are crossed over and brought out within four warp ends of the opposite sides and brought out of the lower side of the shed at 135a and 136a, and followed up by movement of the shuttle to the left as seen in FIG. 11 to position locking weft thread 137 over the warp ends 135 and 136. The four warp ends woven through weft-wise at one side and including warp ends 127, 130, 133 and 136 are arranged together and the outer ends may be tied or knotted to keep them together. Likewise, the four warp ends 126, 129, 132 and 135 extending weft-wise from the other side may be arranged together and secured together by knotting together at their ends. For purposes of clarification, the warp ends 127, 130, 133 and 136 may be secured together as indicated by the numeral 138, while the warp ends 126, 129, 132 and 135 may be secured together as indicated by the numeral 139.

The other four warp ends extending from the opposite sides of the tube and from loom L–2 may also be secured together and will pull warp-wise, these being identified as warp ends 140 and 141. Thus, there will be two groups of four warp ends each 138 and 139 pulling weft-wise and two groups of four warp ends each 140 and 141 pulling warp-wise.

The weft-wise warp ends may be further locked in by taking the shuttle to the right through a shed defined by harnesses H–4 of looms L–3, L–4, L–5 and L–6 to position a weft thread 142.

A second set of cords is then defined and woven in weft-wise and warp-wise in much the same manner as above by initially releasing the spools carrying the warp ends controlled by the harnesses H–3 and H–4 on loom L–3. These warp ends are then pulled from the loom and cut with the warp ends coming from the loom being suitably fastened to the beater and the warp ends extending from the tube being arranged for subsequent weaving procedure. After defining a shed with harnesses H–3 of looms L–4, L–5 and L–6, the outermost warp ends 143 and 144 are crossed through the shed and brought out at 143a and 144a between looms L–4 and L–5. A tabby is then taken by moving the shuttle to the left as seen in FIG. 11 to position a weft thread 145 over the warp ends 143 and 144. With a shed now defined by harnesses H–4 of looms L–4, L–5 and L–6 the next two outermost warp ends 146 and 147 are crossed over and brought out at 146a and 147a, and followed up with a tabby by taking the shuttle to the right as seen in FIG. 11 and positioning a weft thread 148 thereover. Similarly with a shed defined by harnesses H–3 of looms L–4, L–5 and L6, the next outermost warp ends 149 and 150 are crossed over through the shed and out at 149a and 150a and followed up by a tabby by moving the shuttle to the left as seen in FIG. 9 and positioning a weft thread 151 thereover. Finally the fourth next outermost warp ends 152 and 153 are crossed over through a shed defined by harnesses H–4 of looms L–4, L–5 and L–6 and taken out at 152a and 153a. The warp ends woven weft-wise are then locked in place by a pair of tabby where the shuttle is taken to the right as seen in FIG. 11 through the entire shed defined by harnesses H–4 of looms L–4, L–5 and L–6 to position weft thread 154 thereover, and back to the left through a shed defined by harnesses H–3 of looms L–4, L–5 and L–6 to position the weft thread 155.

The woven in weft-wise warp ends 144, 147, 150 and 153 are then tied together and indicated at 156, while the woven in weft-wise warp ends 143, 146, 149 and 152 are tied together and indicated by the numeral 157. Similarly, the remaining warp ends running free from loom L–3 may be tied together to define at opposite sides groups of four warp ends 158 and 159 thereby defining a second set of warp ends pulling warp-wise and a second set of warp ends pulling weft-wise.

A third set of cords is then defined in much the same manner to also pull weft-wise and warp-wise by releasing the spools holding the warp ends controlled by harnesses H–3 and H–4 of loom L–4. These warp ends are cut as before. Again the outermost four warp ends are woven in weft-wise and the inner four are permitted to extend warp-wise.

More specifically, the outermost warp ends 158 and 159 are crossed over through a shed defined by harnesses H–3 of looms L–5 and L–6 and brought at 158a and 159a between the looms L–5 and L–6. This is followed with a tabby having a weft thread 160 for locking the warp ends in position. The next two outermost warp ends 161 and 162 are then brought through a sheld defined by harnesses H–4 of looms L–5 and L–6 and out at 161a and 162a. The tabby is carried along to lock in warp ends 161 and 162 by a weft thread 163. The next two outermost weft ends 164 and 165 are carried through a shed defined by harnesses H–3 of looms L–5 and L–6 and taken out at 164a and 165a. A tabby is then carried through the entire shed to lock the warp ends in place and thereby position a weft thread 166 thereover. Finally the next outermost warp ends 167 and 168 are crossed over and through a shed defined by harnesses H–4 of looms L–5 and L–6 and taken out at 167a and 168a. A tabby is then carried along whereby a weft thread 169 initially locks the warp ends in place, and then with a shed defined by harnesses H-3 of looms L-5 and L-6 the tabby is carried back therethrough to further lock the warp ends in position and position a weft thread 170. The ends of the warp ends 159, 162, 165 and 168 pulling weft-wise may be knotted together and indicated at 172, while the warp ends 158, 161, 164 and 167 pulling weft-wise may be knotted together at the ends and indicated at 173. And similarly, the warp ends extending from loom L-4 at each side and pulling warp-wise may be secured together and indicated at 174 and 175.

A fourth set of cords is then formed by releasing the warp ends from the spools corresponding to harnesses H-3 and H-4 on loom L-6, cutting the warp ends and dividing them into two sets of four as defined by numerals 176 and 177. These groups of warp ends are then secured together and crossed over all the way to the edge of the warp ends controlled by loom L-5. The shuttle is then operated to tabby and lock the positioning of these warp ends so that they will pull weft-wise. The warp ends 176 and 177 may be passed through sheds defined by raising the harnesses H-3 of loom L-5. A tabby may be then taken by taking the shuttle to the left as seen in FIG. 11 and positioning a weft thread 178. The shuttle may then be passed back through the shed defined by harnesses H-4 of loom L-5 thereby leaving a weft thread 179, and similarly tabbying twice more by alternating the shed defined by harnesses H-3 and H-4 of loom L-5 to futher define weft locking threads 180 and 181.

The weft thread in the shuttle is then cut and overcast 182 is applied to prevent loosening of the weft threads 178, 179, 180 and 181 and to lock them in fixed position.

The remaining warp ends held by the spools corresponding to harnesses H-3 and H-4 on loom L-5 are pulled and cut. These warp ends are tied together at opposite sides and designated 183 and 184, thereby establishing all warp ends as cut from the loom except the warp ends in loom L-1.

The next step in the weaving process consists of weaving together the ends of the cords into the patch portions to be attached to the side walls of the left ventricle and particularly to the papillary muscles of the heart. As already stated, the only warp ends still connected in the loom are those of loom L-1 at the opposite sides of the valve which include those warp ends generally designated by the numerals 185 and 186 on the top side of the valve and those warp ends designated by the numerals 187 and 188 on the bottom sides of the valve as seen in FIGS. 10, 11 and 12. Harness H-1 of loom L-1 is raised to define a shed, and a spacer member is positioned between the shed at each side of the valve tightly against the lower periphery of the valve and the overcast 100. These spacer members may be of any desired dimension to preclude weaving along the warp ends where the spacer members are positioned. The spacer members comprise thin sheets of material such as cardboard or the like and of sufficient width to extend beyond the opposite sides of the warp ends. For example, in weaving the heart valve of the present invention the spacer members should be of a depth along the warp ends approximately 1.5 centimeters, or preferably 1.5 centimeters square for ease in handling. With a shed defined by harness H-1, the spacer members would be arranged along the top side of the tube, and then a shed is defined by raising harnesses H-1, H-2 and H-4 of loom L-1 so that spacer members may also be inserted along the bottom side of the tube.

Approximately 0.1 centimeter of tabby is then woven in in order to lock the spacer members or plates in position along the warp ends 185, 186, 187 and 188 during subsequent weaving procedures which consist of weaving in together the ends of the cords along the warp ends of loom L-1 to define the patch portions of the valve. The 0.1 centimeter of tabby is illustrated in FIGS. 10 and 11 as the area opposite the area designated by the numeral 189, and this weaving is accomplished by using a pair of shuttles having weft threads one on each side of the valve. Thus, one shuttle will be used along the warp ends 185 and 188 and another shuttle will be used along the warp ends 186 and 187. And since each patch portion is woven from the warp ends in the top and bottom sides of the tube, a semi-tubular portion is defined at each side of the valve when the upper and lower sides are interwoven together at the outermost edges of the valve. The shuttles are first taken inwardly through the shed defined by harness H-1 of loom L-1 and returned and taken outwardly through a shed defined by harness H-2 of loom L-1. Then the shuttle is taken inwardly back through a shed defined by harnesses H-1, H-2 and H-3 and outwardly through a shed defined by harnesses H-1, H-2 and H-4. These steps are repeated until 0.1 centimeter of weaving as indicated at 189 is completed.

The ends of the cords are now to be woven into the patch portions of the valve.

The cords along the top side of the tube and on the right-hand side designated by the numerals 117, 117a, 120, 122, 124 and 126 will effectively be woven in the warp ends 185 and 188, while the cords defined by numerals 116, 116a, 119, 121, 123 and 125 on the other side will be effectively woven in the warp ends 186 and 187. Similarly, the cords on the bottom side of the tube and at the left-hand end as viewed in the loom and at the right-hand side as viewed in FIG. 11 and defined by numerals 140, 138, 158, 156, 174, 172, 177 and 184 will be interwowen in the warp ends 186 and 187, while the cords on the other side and designated by the numerals 141, 139, 159, 157, 175, 173, 176 and 184 will be interwoven in the warp ends 185 and 188.

Starting at the top side of the tube, the two outermost cords 116 and 117 are taken through the upper part of the shed defined by harness H-1 at 116b and 117b which is located at the outer edges of the warp ends 185 and 186 and inwardly between the outermost and next outermost warp ends. The cords 116, 117 are taken to the outside as indicated by the lines on FIG. 12 identified as 116bo and 117bo. The cords 116 and 117 are then threaded through weft-wise the entire shed defined by harnesses H-1, H-2 and H-3 as indicated by the lines 116bi and 117bi, FIGS. 10 and 12, thereby to lock the cords in place.

The corresponding outermost cords 140 and 141 on the lower group are then dropped through the lower part of a shed defined by harnesses H-1, H-2 and H-4 at 140a and 141b or one warp end in from the outer edges of the warp ends of loom L-1. These cords are threaded to the outside as indicated by the lines 140o and 141o, and then locked in place by being taken through the entire shed defined by harness H-2 toward the center of the tube as indicated by the lines 140i and 141i. The cords 116, 117, 140 and 141 are then locked in position by tabby consisting of taking both shuttles inwardly through shed one and returning outwardly on shed two, again inwardly on shed defined by harnesses H-1, H-2 and H-3 and outwardly through the shed defined by harnesses H-1, H-2 and H-4.

The procedure for weaving in cords 116, 117, 140 and 141 is repeated for weaving in the next outermost set of cords 116a, 117a, 138 and 139, but threading these cords through the warp ends inwardly and additional warp end as indicated at 116c, 117c, 138a, and 139a, respectively. This is followed by locking the cords in as were cords 116, 117, 140 and 141, followed by tabby as above to fully lock the cords in weft-wise position. This same procedure is followed with the next eight sets of cords 119, 120, 158 and 159; 121, 122, 156 and 157; 123, 124, 174 and 175; and 125, 126, 172 and 173.

When all sets of cords from the upper group are woven in along with the corresponding cords of the lower group, there remains only the cords 176, 177, 183 and 184 that have not been interwoven into the patch portions of the valve. Inasmuch as the cords 177 and 184 are woven in together on one side in one patch portion and the cords 176 and 183 are woven together on the other side in the other patch portion, these cords may be secured together in groups as indicated by the numerals 190 and 191, respectively, FIGS. 11 and 12. The now combined cords 190 and 191 are taken outwardly through the entire shed defined by harnesses H–1, H–2 and H–4 as indicated by lines 190o and 191o and brought back inwardly through the entire shed defined by harness H–2 as indicated by the lines 190i and 191i. Tabby is then provided to lock the last cords 190 and 191 in place on the patch portions of the valve. The shuttles carry the weft threads inwardly thorugh the shed defined by harness H–1 and outwardly through the shed defined by harness H–2 and then again inwardly thorugh the shed defined by harnesses H–1, H–2 and H–3 and outwardly through the shed defined by harnesses H–1, H–2 and H–4. This is repeated until approximately 0.1 centimeter of tabby is provided as indicated by the numeral 192. In order to securely lock the weft threads in position, the free end edges of the patch are overcast at 193. The warp ends of loom L–1 may then be cut from the loom and the valve removed therefrom. After removal of the spacer members along the warp ends 185, 186, 187 and 188, these warp ends define free runs between the tube and the patch portions, and overcast 194 may be provided along the inner edges of the patches in order to securely lock the tabby 189 together.

Preferably, the warp ends 185, 186, 187 and 188 are cut long enough from the loom so that they extend a substantial distance from the end of the overcast 193.

It may then be appreciated that the cords are woven in weft-wise in the patches and may be pulled back and forth through the patches in order to adjust their lengths and the distances between the patches and the extensions which define the leaflets.

Atfer the weaving process has been completed, the length of the cords is adjusted and the entire valve structure is coated or impregnated with the plastic material. The coating of the woven structure adds overall strength to the valve, and the plastic and fabric in effect reinforce each other. Following the coating process, the tube portion is cut to predetermined size and the aortic bulge is cut along the upper periphery. The valve is then ready for installation in a natural heart.

It will be understood that modifications and variations may be effected without departing from the scope of the novel concepts of the present invention, but it is understood that this application is to be limited only by the scope of the appended claims.

The invention is hereby claimed as follows:

1. A woven artificial heart valve adapted to be used between an auricle and a ventricle of a heart for preventing flow of blood from the ventricle to the auricle, said valve comprising a sleeve portion, the upper peripheral edge of the sleeve portion adapted to be secured to the juncture between the auricle and the ventricle, a first extension portion along a part of the lower peripheral edge of the sleeve portion, a second extension portion along another part of the lower peripheral edge of the sleeve portion and directly opposite to said first extension portion, a plurality of warp threads extending from the lower peripheral edge of the sleeve section and from the free edges of said extension portions, half of the warp threads forming the sleeve portion being woven together to form a first patch portion in spaced relation to the sleeve portion, and the other half of the warp threads being woven together to form a second patch portion, said patch portions adapted to be secured to the side walls of the ventricle in such a manner as to control the closing action of the valve.

2. A woven artificial mitral valve adapted to be used in a natural heart, said valve comprising a tubular portion having upper and lower peripheral edges, the upper edge adapted to be secured to the juncture between the left auricle and left ventricle of the heart, a first extension portion along the lower edge and a second extension portion along the lower edge and opposite from said first extension, said second extension being smaller than said first extension, a pair of patch portions spaced below said lower edge and adapted to be secured to the papillary muscles in the left ventricle of the heart, the warp threads of the tubular portion extending from the lower edge and the extension portions and being interwoven into the patch portions to define control cords for controlling the closure of the valve.

3. A woven artificial mitral valve adapted to be used in a natural heart, said valve comprising a tubular portion having upper and lower peripheral edges, the upper edge adapted to be secured to the juncture between the left auricle and left ventricle of the heart, an upwardly projecting extension along the upper edge, a first extension portion along the lower edge, a second extension portion along the lower edge and opposite from said first extension, said second extension being smaller than said first extension, a pair of patch portions spaced below said lower edge and adapted to be secured to the papillary muscles in the left ventricle of the heart, the warp threads of the tubular portion extending from the lower edge and the extension portions and being interwoven into the patch portions to define control cords for controlling the closure of the valve.

4. A woven artificial mitral valve adapted to be used in a natural heart, said valve comprising a tubular portion having upper and lower peripheral edges, the upper edge adapted to be secured to the juncture between the left auricle and left ventricle of the heart, a first extension portion along the lower edge, a second extension portion along the lower edge and opposite from said first extension, said second extension being smaller than said first extension, a pair of patch portions spaced below said lower edge and adapted to be secured to the papillary muscles in the left ventricle of the heart, said patch portions being positioned in opposed relation and along an axis extending normal to the axis extending through said extensions, the warp threads of the tubular portion extending from the lower edge and the extension portions and being interwoven into the patch portions to define control cords for controlling the closure of the valve.

5. A woven artificial mitral valve adapted to be used in a natural heart, said valve comprising a tubular portion having upper and lower peripheral edges, the upper edge adapted to be secured to the juncture between the left auricle and left ventricle of the heart, a first extension portion along the lower edge, a second extension portion along the lower edge and opposite from said first extension, said second extension being smaller than said first extension, a pair of patch portions spaced below said lower edge and adapted to be secured to the papillary muscles in the left ventricle of the heart, the warp threads of the tubular portion extending from the lower edge and the extension portions and being interwoven into the patch portions to define control cords for controlling the closure of the valve, at least a pair of said cords extending from said first extension being woven weft-wise therein, and said valve being coated with plastic.

6. A woven artificial mitral valve adapted to be used in a natural heart, said valve comprising a tubular portion having upper and lower peripheral edges, the upper edge adapted to be secured to the juncture between the left auricle and left ventricle of the heart, a first extension portion along the lower edge, a second extension portion along the lower edge and opposite from said first extension, said second extension being smaller than said first extension, a pair of patch portions spaced below said lower edge and adapted to be secured to the papillary muscles in the left ventricle of the heart, the warp threads of the tubular portion extending from the lower edge and the extension portions and being interwoven into the patch portions to define control cords for controlling the closure of the valve, at least a pair of said cords extending from each of said extensions being woven weft-wise therein, and a plastic coating on said valve.

7. A woven artificial mitral valve adapted to be used in a natural heart, said valve comprising a tubular portion having upper and lower peripheral edges, the upper edge adapted to be secured to the juncture between the left auricle and left ventricle of the heart, a first extension portion along the lower edge, a second extension portion along the lower edge and opposite from said first extension, said second extension being smaller than said first extension, a pair of patch portions spaced below said lower edge and adapted to be secured to the papillary muscles in the left ventricle of the heart, the warp threads of the tubular portion extending from the lower edge and the extension portions and being interwoven into the patch portions to define control cords for controlling the closure of the valve, at least a pair of said cords extending from each of said extensions being woven weft-wise therein, and a plastic coating on said valve, at least a pair of said cords extending from each of said extensions being woven weft-wise in said patch portions, and a plastic coating on said valve.

8. A woven artificial mitral valve adapted to be used in a natural heart, said valve comprising a tubular portion having upper and lower peripheral edges, the upper edge adapted to be secured to the juncture between the left auricle and left ventricle of the heart, an upwardly projecting extension along the upper edge, a first extension portion along the lower edge and in alignment with said upwardly projecting extension and coacting therewith and with the area of the tubular portion therebetween to correspond to the anterior leaflet of the natural mitral valve, a second extension along said lower edge diametrically opposite said first extension coacting with the area of the tubular portion thereabove to correspond to the posterior leaflet of the natural valve, the areas of the tubular portion extending between the opposed ends of said anterior and posterior leaflets corresponding to the lateral leaflets of the nautral valve, some of said warp threads of said first and second extensions being woven weft-wise therein and extending freely therefrom and others being woven warp-wise and extending freely therefrom, other warp-wise woven warp threads extending freely from the lower edge between said extensions, a pair of patch portions woven by the warp threads extending from the lower edge and having the threads extending freely from the extensions interwoven weft-wise therein, said freely extending threads corresponding to the chorade tendineae of the natural valve and said patch portions adapted to be secured to the papillary muscles of the natural heart, and said valve being entirely coated with a plastic.

9. A woven artificial mitral valve adapted to be used in a natural heart, said valve comprising a tubular portion having upper and lower peripheral edges, the upper edge adapted to be secured to the juncture between the left auricle and left ventricle of the heart, an upwardly projecting extension along the upper edge, a first extension portion along the lower edge and in alignment with said upwardly projecting extension and coacting therewith and with the area of the tubular portion therebetween to correspond to the anterior leaflet of the natural mitral valve, a second extension along said lower edge diametrically opposite said first extension coacting with the area of the tubular portion thereabove to correspond to the posterior leaflet of the natural valve, the areas of the tubular portion extending between the opposed ends of said anterior and posterior leaflets corresponding to the lateral leaflets of the natural valve, some of said warp threads of said first and second extensions being woven weft-wise therein and extending freely therefrom and others being woven warp-wise and extending freely therefrom, other warp-wise woven warp threads extending freely from the lower edge between said extensions, a pair of patch portions woven by the warp threads extending from the lower edge and having the threads extending freely from the extensions interwoven weft-wise therein, said freely extending threads corresponding to the chordae tendineae of the natural valve and said patch portions adapted to be secured to the papillary muscles of the natural heart, and said valve being entirely coated with a plastic, said plastic being of a type that is non-permeable, non-wettable, inert to the body, resilient, and capable of defining a smooth and slippery surface.

10. The woven artificial heart valve defined in claim 9, wherein the warp threads woven weft-wise in the extensions are brought out of the extensions inwardly of the edges thereof.

11. A method of weaving an artificial heart valve on a hand powered loom which comprises providing a plurality of pairs of warp threads in said loom, weaving with a weft thread a tubular portion along said threads, weaving a first segmental portion along part of said tubular portion, cutting a plurality of warp threads on each end of said first segmental portion and weaving some of said cut threads in weft-wise, weaving a second segmental portion along part of said tubular portion, cutting a plurality of warp threads extending from each end of said second segmental portion and weaving a part of said cut threads in weft-wise with the uncut warp threads, cutting the remaining warp threads extending from said segmental portions, and weaving all of said cut threads extending from said segmental portions weft-wise with the warp threads projecting from areas of the tubular portion extending between the opposed ends of said segmental portions.

12. A method of weaving an artificial heart valve on a hand powered loom which comprises providing a plurality of pairs of warp threads and a single warp thread in said loom, weaving in a weft thread through said warp threads to define a seamless tube, resting a plurality of warp threads at each side of the tube and along the bottom thereof, weaving in a weft thread through the warp threads along the top of the tube to define a first segmental portion along the top of the tube, cutting a plurality of the warp threads extending from each end of said first segmental portion thereby defining cut and uncut warp threads extending therefrom, weaving substantially half of the cut warp threads in weft-wise with the uncut warp threads, cutting the remaining uncut warp threads extending from the first segmental portion, weaving a weft thread through the warp threads a long the bottom of the tube to define a second segmental portion along the bottom of the tube and opposite said first segmental portion, successively cutting warp threads at opposite ends of said second segmental portion and weaving substantially half of said cut threads in weft-wise to define in stepped relation a plurality of sets of warp threads extending weft-wise and warp-wise from said second segmental portion, and weaving in weft-wise the remaining cut warp threads extending from said segmental portions through said warp threads rested at each side of the tube to define patch portions in spaced relation with said tube.

13. A method of weaving an artificial heart valve on a hand powered loom which comprises providing a plurality of pairs of warp threads and a single warp thread in said loom, weaving in a weft thread through said warp threads to define a seamless tube, resting a plurality of warp threads at each side of the tube and along the bottom thereof, weaving in a weft thread through the warp threads along the top of the tube to define a first segmental portion along the top of the tube, cutting a plurality of the warp threads extending from each end of said first segmental portion thereby defining cut and uncut warp threads extending therefrom, weaving substantially half of the cut warp threads in weft-wise with the uncut warp threads, cutting the remaining uncut warp threads extending from the first segmental portion, weaving a weft thread through the warp threads along the bottom of the tube to define a second segmental portion along the bottom of the tube and opposite said first segmental portion, successively cutting a plurality of warp threads at opposite ends of said second segmental portion thereby defining cut and uncut warp threads and weaving in substantially half of the cut threads weft-wise through the uncut threads until only a relatively small number of warp threads remain ucut, cutting a plurality of the uncut threads at the center thereof and weaving these threads in weft-wise with the remaining uncut threads, cutting the remaining uncut threads, and permitting the remaining threads to extend warp-wise of the second segmental portion, whereby the threads woven in weft-wise extend weft-wise of said second segmental portion and all other threads extend warp-wise, and weaving all of the cut threads extending from said segmental portions in weft-wise with said warp threads resting at each side of the tube in spaced relation to said tube to connect the ends of the threads and define patch portions.

14. A method of weaving an artificial heart valve on a hand powered loom which comprises providing a plurality of pairs of warp threads in said loom, weaving with a weft thread a tubular portion along said threads, weaving a first segmental portion along part of said tubular portion, cutting a plurality of warp threads on each end of said first segmental portion and weaving some of said cut threads in weft-wise, weaving a second segmental portion along part of said tubular portion, cutting a plurality of warp threads extending from each end of said second segmental portion and weaving a part of said cut-threads in weft-wise with the uncut warp threads, cutting the remaining warp threads extending from said segmental portions, weaving all of said cut threads extending from said segmental portions weft-wise with the warp threads projecting from areas of the tubular portion extending between the opposed ends of said segmental portions, and coating said valve with a plastic material capable of being non-permeable, non-wettable, resilient, inert to the body and of defining a slippery and smooth surface.

15. A method of weaving an artificial heart valve on a hand powered loom which comprises providing a plurality of pairs of warp threads and a single warp thread in said loom, weaving in a weft thread through said warp threads to define a seamless tube, resting a plurality of warp threads at each side of the tube and along the bottom thereof, weaving in a weft thread through the warp threads along the top of the tube to define a first segmental portion along the top of the tube, cutting a plurality of the warp threads extending from each end of said first segmental portion thereby defining cut and uncut warp threads extending therefrom, weaving substantially half of the cut warp threads in weft-wise with the uncut warp threads, cutting the remaining uncut warp threads extending from the first segmental portion, weaving a weft thread through the warp threads along the bottom of the tube to define a second segmental portion along the bottom of the tube and opposite said first segmental portion, successively cutting a plurality of warp threads at opposite ends of said second segmental portion thereby defining cut and uncut warp threads and weaving in substantially half of the cut threads weft-wise through the uncut threads until only a relatively small number of warp threads remain uncut, cutting a plurality of the uncut threads at the center thereof and weaving these threads in weft-wise with the remaining uncut threads, cutting the remaining uncut threads, and permitting the remaining threads to extend warp-wise of the second segmental portion, whereby the threads woven in weft-wise extend weft-wise of said second segmental portion and all other threads extend warp-wise, weaving all of the cut threads extending from said segmental portions in weft-wise with said warp threads resting at each side of the tube in spaced relation to said tube to connect the ends of the threads and define patch portions, and coating said valve with a plastic material capable of being non-permeable, non-wettable, resilient, inert to the body and of defining a slippery and smooth surface.

16. A method of weaving an artificial heart valve on a hand powdered loom which comprises providing a plurality of pairs of warp threads and a single warp thread in said loom, weaving in a weft thread through said warp threads to define a seamless tube, resting a plurality of warp threads at each side of the tube and along the bottom thereof, weaving in a weft thread through the warp threads along the top of the tube to define a first segmental portion along the top of the tube, cutting a plurality of the warp threads extending from each end of said first segmental portion thereby defining cut and uncut warp threads extending therefrom, weaving substantially half of the cut warp threads in weft-wise with the uncut warp threads, cutting the remaining uncut warp threads extending from the first segmental portion, weaving a weft thread through the warp threads along the bottom of the tube to define a second segmental portion along the bottom of the tube and opposite said first segmental portion, successively cutting a plurality of warp threads at opposite ends of said second segmental portion thereby defining cut and uncut warp threads and weaving in substantially half of the cut threads weft-wise through the uncut threads until only a relatively small number of warp threads remain uncut, cutting a plurality of the uncut threads at the center thereof and weaving these threads in weft-wise with the remaining uncut threads, cutting the remaining uncut threads, and permitting the remaining threads to extend warp-wise of the second segmental portion, whereby the threads woven in weft-wise extend weft-wise of said second segmental portion and all other threads extend warp-wise, weaving a tab portion along the rested warp threads at each side of said tube in spaced relation to said tube, and weaving all of the cut threads extending from said segmental portions in weft-wise along said tab portions thereby connecting all of said warp threads together at said tab portions.

17. A method of weaving an artificial heart valve on a hand powered loom which comprises providing a plurality of pairs of warp threads and a single warp thread in said loom, weaving in a weft thread through said warp threads to define a seamless tube, resting a plurality of warp threads at each side of the tube and along the bottom thereof, weaving in a weft thread through the warp threads along the top of the tube to define a first segmental portion along the top of the tube, cutting a plurality of the warp threads extending from each end of said first segmental portion thereby defining cut and uncut warp threads extending therefrom, weaving substantially half of the cut threads in with the uncut warp threads, cutting the remaining uncut warp threads extending from the first segmental portion, weaving a weft thread through the warp threads along the bottom of the tube to define a second segmental portion along the bottom of the tube and opposite said first segmental portion, successively cutting a plurality of warp threads at opposite ends of said second segmental portion thereby defining cut and uncut warp threads and weaving in substantially half of the cut threads with the uncut threads until a relatively small number of warp threads remain uncut, cutting a plurality of the uncut threads and weaving these threads in with the uncut threads, cutting the remaining uncut threads, weaving all of the cut threads extending from the segmental portions together with said rested warp threads at each side of said tube in patch portions spaced from said tube to thereby connect the threads together, and coating said valve with a plastic material capable of being non-permeable, non-wettable, resilient, inert to the body and of defining a slippery and smooth surface.

18. A method of weaving an artificial heart valve on a hand powered loom which comprises providing a plurality of pairs of warp threads and a single warp thread in said loom, weaving in a weft thread through said warp threads to define a seamless tube, resting a plurality of warp threads at each side of the tube and along the bottom thereof, weaving in a weft thread through the warp threads along the top of the tube to define a first segmental portion along the top of the tube, cutting a plurality of the warp threads extending from each end of said first segmental portion thereby defining cut and uncut warp threads extending therefrom, weaving substantially half of the cut threads with the uncut threads by successively crossing the outermost cut threads through alternately formed sheds of said uncut threads and bringing the threads out of one portion of the sheds spaced inwardly of the ends of the sheds, cutting the remaining uncut warp threads extending from the first segmental portion, weaving a weft thread through the warp threads along the bottom of the tube to define a second segmental portion along the bottom of the tube and opposite said first segmental portion, cutting warp threads at opposite ends of said second segmental portion and weaving substantially half of the cut threads with the uncut threads by successively crossing the outermost cut threads through alternately formed sheds of said uncut threads and bringing the threads out of one side of the sheds at a point spaced inwardly from the ends of the sheds, successively cutting additional warp threads at each end of the uncut threads and weaving substantially half of the cut threads with the remaining uncut threads until substantially all of the uncut threads are woven together, cutting the remaining warp threads extending from said second segmental portion, and weaving all of the threads extending from said segmental portions with said warp threads resting at each side of the tube in spaced relation to said tube to connect the ends of the threads and define patch portions, and coating said valve with a plastic material capable of being non-permeable, non-wettable, resilient, inert to the body and of defining a slippery and smooth surface.

19. A method of weaving an artificial heart valve on a hand powered loom which comprises providing a plurality of pairs of warp threads and a single warp thread in said loom, weaving in a weft thread through said warp threads to define a seamless tube, resting a plurality of warp threads at each side of the tube and along the bottom thereof, weaving in a weft thread through the warp thread along the top of the tube to define a first segmental portion along the top of the tube, cutting a plurality of the warp threads extending from each end of said first segmental portion thereby defining cut and uncut warp threads extending therefrom, weaving substantially half of the cut threads with the uncut threads by successively crossing the outermost cut threads through alternately formed sheds of said uncut threads and bringing the threads out of one portion of the sheds spaced inwardly of the ends of the sheds, cutting the remaining uncut warp threads extending from the first segmental portion, weaving a weft thread through the warp threads along the bottom of the tube to define a second segmental portion along the bottom of the tube and opposite said first segmental portion, cutting warp threads at opposite ends of said second segmental portion and weaving substantially half of the cut threads with the uncut threads by successively crossing the outermost cut threads through alternately formed sheds of said uncut threads and bringing the threads out of one side of the sheds at a point spaced inwardly from the ends of the sheds, successively cutting additional warp threads at each end of the uncut threads and weaving substantially half of the cut threads with the remaining uncut threads until substantially all of the uncut threads are woven together, cutting the remaining warp threads extending from said second segmental portion, and weaving all of the cut threads extending from said segmental portions with said warp threads resting at each side of the tube in spaced relation to said tube to connect the ends of the threads and define patch portions, adjusting the warp threads in the patch portions to properly define the desired distance between the segmental portions and the patch portions, trimming the tube along the periphery opposite the segmental portions to define a projection in alignment with the second segmental portion, and coating said valve with a plastic material capable of being non-permeable, non-wettable, resilient, inert to the body and of defining a slippery and smooth surface.

References Cited in the file of this patent

UNITED STATES PATENTS

| | | |
|---|---|---|
| 2,677,395 | Harding | May 4, 1954 |
| 2,682,057 | Lord | June 29, 1954 |
| 2,832,078 | Williams | Apr. 29, 1958 |
| 2,903,019 | Knopf | Sept. 8, 1959 |

OTHER REFERENCES

Hufnagel: "Experiences With New Types of Aortic Valvular Prostheses," Annals of Surgery, vol. 147, No. 5, pp. 636–645, May 1958.